United States Patent
Kwon et al.

(10) Patent No.: US 8,180,988 B2
(45) Date of Patent: May 15, 2012

(54) METHOD AND SYSTEM FOR AUTHENTICATING STORAGE DEVICE CONNECTED THROUGH INTERMEDIATE CONVERTER

(75) Inventors: Moon-sang Kwon, Seoul (KR); Chang-eun Choi, Seoul (KR); Sung-joo Kim, Hwaseong-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 340 days.

(21) Appl. No.: 12/627,030

(22) Filed: Nov. 30, 2009

(65) Prior Publication Data

US 2010/0153642 A1    Jun. 17, 2010

(30) Foreign Application Priority Data

Dec. 16, 2008    (KR) .................. 10-2008-0128197

(51) Int. Cl.
*G06F 12/00*    (2006.01)
(52) U.S. Cl. ......... 711/163; 711/103; 711/115; 711/200
(58) Field of Classification Search .................. None
See application file for complete search history.

(56) References Cited

U.S. PATENT DOCUMENTS

2008/0005803 A1 *    1/2008    Morikawa .................. 726/27
2008/0307192 A1 *    12/2008    Sinclair et al. ............... 711/218

FOREIGN PATENT DOCUMENTS

| | | |
|---|---|---|
| JP | 2005134993 | 5/2005 |
| JP | 2006323874 | 11/2006 |
| JP | 2008009734 | 1/2008 |

* cited by examiner

*Primary Examiner* — Shawn X Gu
(74) *Attorney, Agent, or Firm* — Volentine & Whitt, PLLC

(57) ABSTRACT

A system provided for authenticating a storage device includes a computer system, an intermediate converter and a storage device. The computer system stores an application program to execute functions of a storage device. The intermediate converter connects the computer system and the storage device. The storage device store multiple predetermined sector addresses and an order of the predetermined sector addresses. The computer system authenticates the storage device using the application program and sector data stored at the predetermined sector addresses. The predetermined sector addresses may be predetermined by both the storage device and the application program.

17 Claims, 4 Drawing Sheets

METHOD AND SYSTEM FOR AUTHENTICATING STORAGE DEVICE CONNECTED THROUGH INTERMEDIATE CONVERTER

CROSS-REFERENCE TO RELATED APPLICATIONS

A claim of priority is made to Korean Patent Application No. 10-2008-0128197, filed on Dec. 16, 2008, in the Korean Intellectual Property Office, the subject matter of which is hereby incorporated by reference.

BACKGROUND

The inventive concept relates to a storage device, and more particularly, to a method and system for allowing a computer system to authenticate a storage device connected to the computer system through an intermediate converter.

Advances in digital technology have led to an increase in the amount and types of devices that are easy to carry and have multifunctional multimedia functions. Examples of such devices include digital camcorders, mobile phones, MP3 players, digital cameras, and personal digital assistants (PDAs). Many such devices use a memory card including integrated circuit (IC) chips, such as flash memory, in order to store data or extend memory. Examples of memory cards include memory sticks (MS), multimedia cards (MMC), XD picture (XD) cards, secure digital (SD) cards, compact flash (CF), smart media cards (SMC), and micro drives (MD).

These memory cards are small and easily portable, but become more expensive as capacity increases. Since memory cards should comply with corresponding specified standards, an exclusive card reader or multi-type card reader is needed according to the type of memory card used. Also, use of a card reader may be inconvenient since the card reader should be connected to a computer system in order to use the card reader. The card reader may be used to read data from a memory card, or to receive data from or to transmit data to the memory card. For example, in the case of a smart card, a micro chip module manufactured according to ISO7816 standards is built into a magnetic plastic card, so that information may be read from or written to an IC chip. Thus, the smart card may exchange data with a computer system through serial communication by touching the smart card to the card reader.

A memory card and a card reader may be electrically connected according to various interface standards, e.g., universal serial bus (USB) standards, personal computer memory card international association (PCMCIA) standards, PS2 standards, etc. If the memory card is connected to a computer system via the card reader, the card reader allows the memory card to be seen as a USB storage device by the computer system and does not expose information regarding the memory card to the computer system. In this case, the computer system cannot read vendor information stored in the memory card.

In general, a memory card manufacturing company supports only its memory cards, and wants to promote its products by distinguishing them from other companies' products using a program providing special functions. However, a computer system is not capable of determining whether a memory card connected to a card reader provides such additional functions.

SUMMARY

Various embodiments of the inventive concept provide systems and methods for allowing a computer system to authenticate a storage device connected to the computer system via an intermediate converter, such as a card reader.

According to an aspect of the inventive concept, there is provided a system for authenticating a storage device, including a computer system, an intermediate converter and a storage device. The computer system stores an application program to execute functions of a storage device. The intermediate converter connects the computer system and the storage device. The storage device store multiple predetermined sector addresses and an order of the predetermined sector addresses. The computer system authenticates the storage device using the application program and sector data stored at the predetermined sector addresses. The predetermined sector addresses may be predetermined by both the storage device and the application program.

If the order of sector addresses at which the read operation is to be sequentially performed is identical with that of the predetermined sector addresses, the storage device may change a predetermined part of return data regarding a last request to perform the read operation and provide the return data to the intermediate converter until a current sector address becomes identical with a last sector address starting from a first sector address, where the first through last sector addresses are necessary to perform an authentication process.

The application program may authenticate the storage device when the predetermined part of the return data regarding the last sector address has a predetermined pattern from among the predetermined sector addresses.

The storage device may change a predetermined part of return data and provide the return data to the intermediate converter. The return data is to be changed to specific values as specific offsets of the sector data stored at the predetermined sector addresses. The storage device may perform an authentication process until a current sector address at which one of a read operation and a write operation is to be performed becomes identical with a last sector address, starting from a first sector address, where the first to last sector addresses are necessary for performing the authentication process. When the predetermined part of the return data has a predetermined pattern, the application program authenticates the storage device.

The intermediate converter may be a card reader. The storage device may be a memory card, such as a memory stick (MS), a multimedia card (MMC), an XD picture (XD) card, a secure digital (SD) card, compact flash (CF), a smart media card (SMC), or a micro drive (MD). The storage device may perform functions which are specifically supported by a manufacturing company of the storage device.

According to another aspect of the inventive concept, there is provided a method of authenticating a storage device, which is connected to a computer system via an intermediate converter, to perform functions of the storage device. The method includes storing sector addresses, which are predetermined by both the storage device and an application program of the computer system, and an order of the sector addresses; receiving a request initiated by the application program to perform a read operation at the predetermined sector addresses; incrementally determining whether each predetermined sector address is a last sector address, starting from a first sector address; and changing a predetermined part of return data and providing the return data to the intermediate converter when the sector address is determined to be the same as the last sector address. The return data is to be changed to write specific values as specific offsets of sector data stored at the sector address, where the first to last sector addresses are necessary to perform the authentication process. The application program authenticates the storage device when the predetermined part of the return data has a predetermined pattern.

BRIEF DESCRIPTION OF THE DRAWINGS

Various embodiments of the inventive concept will be described in farther detail with reference to the attached drawings, in which.

DETAILED DESCRIPTION OF THE EMBODIMENTS

Figure 1:
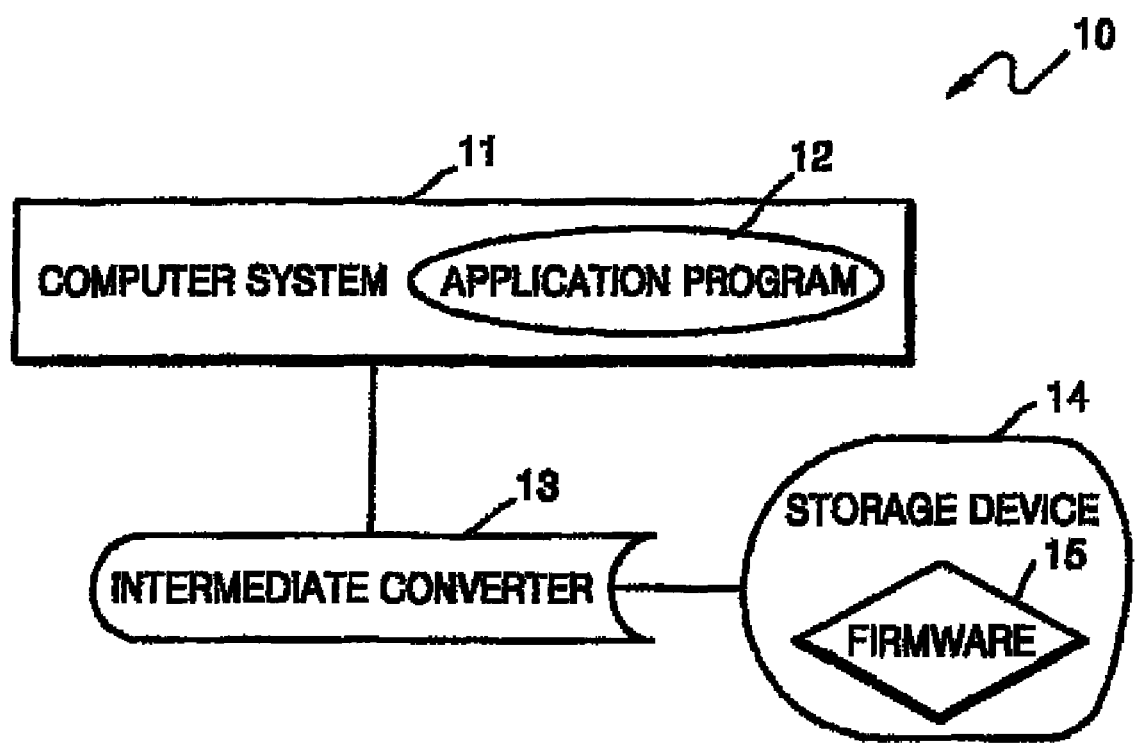
FIG. 1 is a block diagram illustrating a system for authenticating a storage device, according to an embodiment.

Various embodiments of the inventive concept will now be described more fully with reference to the accompanying drawings, in which illustrative embodiments are shown. The inventive concept, however, may be embodied in various different forms, and should not be construed as being limited only to the illustrated embodiments. Rather, these embodiments are provided as examples, to convey the inventive concept to one skilled in the art. Accordingly, known processes, elements, and techniques are not described with respect to some of the embodiments. Throughout the drawings and written description, like reference numerals will be used to refer to like or similar elements.

FIG. 1 is a block diagram of a system 10 for authenticating a storage device, according to an illustrative embodiment. Referring to FIG. 1, in the system 10, a computer system 11 authenticates a storage device 14 connected to the computer system 11 via an intermediate converter 13, such as a card reader. In an embodiment, the storage device 14 is configured to perform special additional functions, for example, provided by the manufacturer of the storage device 14. In the computer system 11, an application program 12 executed by a central processing unit (CPU) (not shown) is stored in an embedded memory (not shown). The application program 12 enables the special additional functions associated with the storage device 14 when the storage device 14 can be authenticated. Therefore, the application program 12 includes an authentication method for determining whether the special additional functions of the storage device 14 are to be provided. In order to authenticate the storage device 14, the application program 12 reads sector data stored at predetermined sector addresses, and checks whether the read sector data has a predetermined pattern.

The intermediate converter 13 reads and interprets information stored in the storage device 14, which is inserted into or otherwise connected to the intermediate converter 13. The storage device 14 may be a memory card, such as a memory stick (MS), a multimedia card (MMC), an XD picture (XD) card, a secure digital (SD) card, compact flash (CF), a smart media card (SMC), or a micro drive (MD). The storage device 14 includes an embedded memory to store the sector data at the sector addresses that are predetermined by both the storage device 14 and the application program 12 for authentication, and includes firmware 15 to perform the authentication method requested by the application program 12. In an embodiment, the order of predetermined sector addresses SA0, SA1, . . . , through SAk of the storage device 14 and a specific data pattern stored in these sector addresses have been predetermined by both the application program 12 and the firmware 15 of the storage device 14.

Figure 2A:
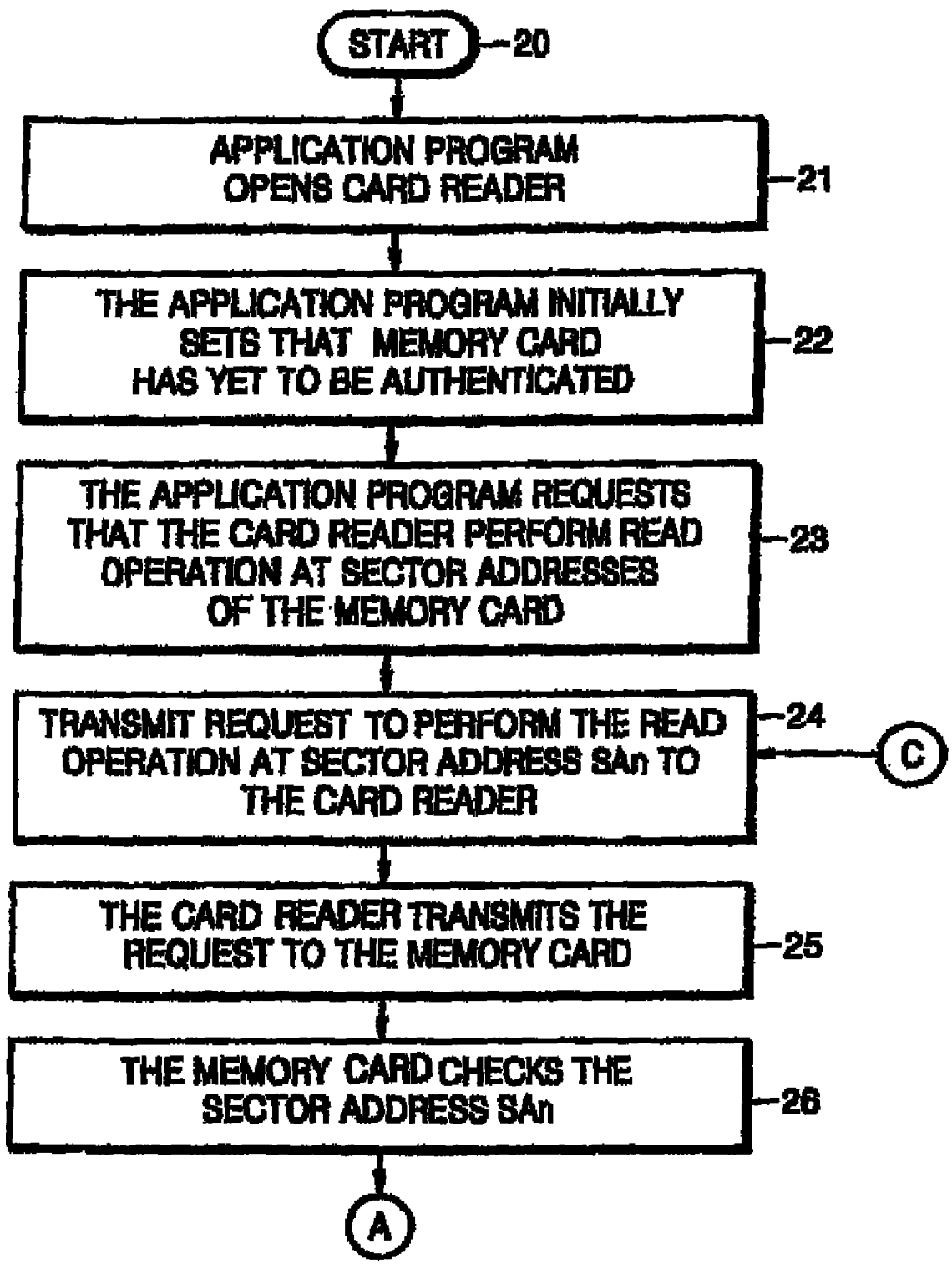
FIGS. 2A to 2C are flowcharts illustrating a method of authenticating a storage device in the system of FIG. 1, according to an embodiment.
Figure 2B:
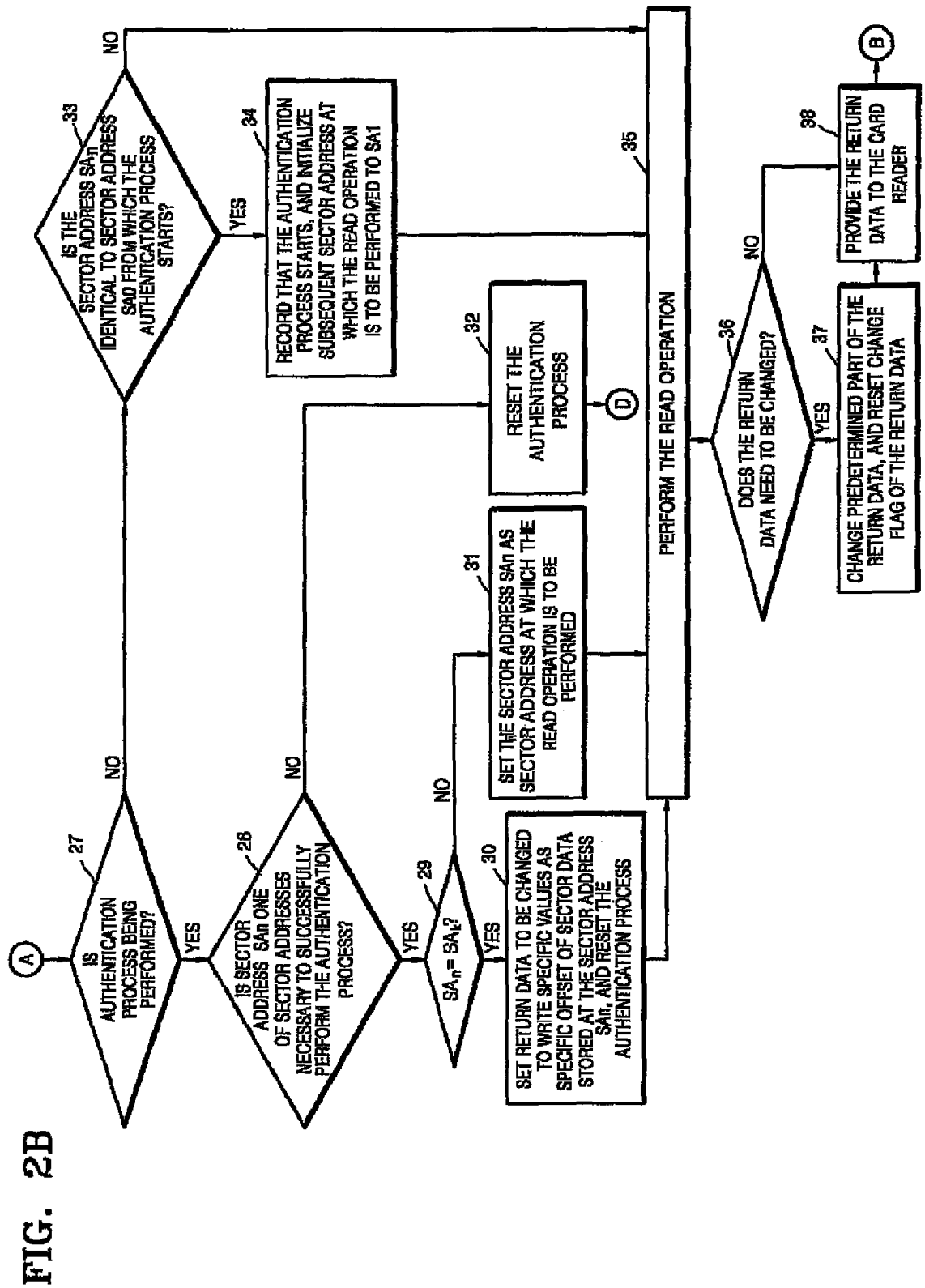
Figure 2C:
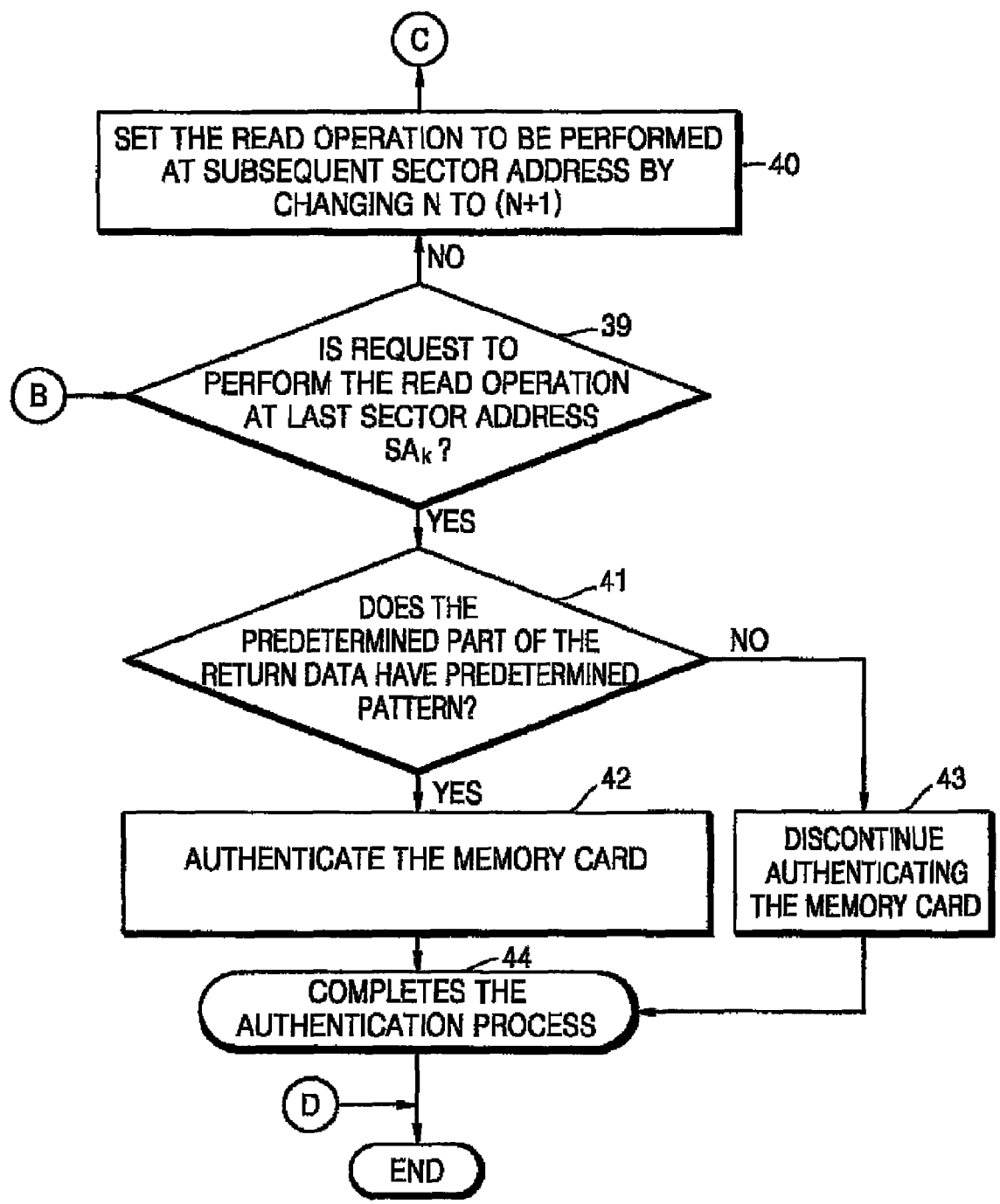

FIGS. 2A to 2C are flowcharts illustrating a method of authenticating the storage device 14 in the system 10 of FIG. 1, according to an illustrative embodiment. FIGS. 2A to 2C will be described in conjunction with FIG. 1. Initially, it is assumed that the storage device 14 is connected to the computer system 11 via the intermediate converter 13. In an embodiment, it is also assumed that the storage device 14 is a memory card and the intermediate converter 13 is a card reader, for example.

First, the application program 12 stored in the computer system 11 starts authentication of the storage device 14 (operation 20). Next, the application program 12 operates or opens the intermediate converter 13 registered with the computer system 11 (operation 21). At this time, the storage device 14 has yet to be authenticated and thus has been initialized. As described below, a value for determining whether to change a part of sector data of the storage device 14, when the sector data is delivered to the intermediate converter 13 in response to a request to perform a read operation made by the application program 12, is set to "False".

The application program 12 initially sets that the storage device 14 has not yet been authenticated and has been initialized (operation 22). The application program 12 requests that the intermediate converter 13 perform the read operation of the sector data stored at sector addresses of the storage device 14 (operation 23).

The application program 12 transmits a request to the intermediate converter 13 to perform the read operation at the sector address SAn of the storage device 14 (n is a natural number ranging from 0 to k) (operation 24). The intermediate converter 13 transmits the request to the storage device 14 (operation 25).

The storage device 14 checks the sector address SAn (operation 26), and determines whether the authentication process is being performed (operation 27). When it is determined in operation 27 that the authentication process is being performed, the storage device 14 determines whether the sector address SAn is an address necessary to successfully perform the authentication process (operation 28).

When it is determined in operation 28 that the sector address SAn is an address necessary to successfully perform the authentication process, the storage device 14 determines whether the sector address SAn is the last sector address SAk that is to be authenticated (operation 29). When the sector address SAn is the last sector address SAk, the storage device 14 sets an indication that return data is to be changed, e.g., by setting a change flag of the return data, in order to write specific values as a specific offset of the sector data stored in the sector address SAk, and resets the authentication process (operation 30). Then, the storage device 14 performs the read operation by reading sector data from the last sector address SAk (operation 35). When it is determined in operation 29 that the sector address SAn is not the last sector address SAk, the storage device 14 sets the sector address SAn as the sector address that is to be read (operation 31), and performs the read operation at the sector address SAn (operation 35).

When it is determined in operation 28 that the sector address SAn is not any one of the sector addresses necessary to successfully perform the authentication process, the storage device 14 resets the authentication process (operation 32).

When it is determined in operation 27 that the sector address SAn is not being authenticated, the storage device 14 determines whether the sector address SAn is a sector address SA0 from which the authentication process is to start (operation 33). When it is determined in operation 33 that the sector address SAn is the sector address SA0, the storage device 14 records that the authentication process has started, and initializes a subsequent sector address, at which the read operation is to be performed, to "SA1" (operation 34).

When it is determined in operation 33 that the sector address SAn is not the sector address SA0, the storage device 14 performs the read operation at the sector address SAn (operation 35).

After performing the read operation in operation 35, the storage device 14 determines whether to change the return data (operation 36). When it is determined in operation 36 that the return data is to be changed (e.g., as determined in operation 30), the storage device 14 changes a predetermined part of the return data and resets the change flag of the return data to true (operation 37). The storage device 14 provides the changed return data to the intermediate converter 13 (operation 38). When it is determined in operation 36 that the return data is not to be changed, the return data is provided without change to the intermediate converter 13 (operation 38).

After the return data is provided to the intermediate converter 13 (operation 38), the application program 12 determines whether the request to perform the read operation is related to the last sector address SAk (operation 39). When the request is not related to the last sector address SAk, the application program 12 sets the read operation to be performed at a subsequent sector address by incrementing n to (n+1) (operation 40), and then returns to operation 24 in order to request the intermediate converter 13 to perform the read operation at sector address SAn+1. Operations 24 through 38 are then performed for address SAn+1.

When it is determined in operation 39 that the request is related to the last sector address SAk, the application program 12 determines whether the predetermined part of the return data has a predetermined pattern (operation 41). When it is determined in operation 41 that the predetermined part of the return data has the predetermined pattern, the application program 12 authenticates the storage device 14 (operation 42), and completes the authentication process (operation 44). When it is determined in operation 41 that the predetermined part of the return data does not have the predetermined pattern, the application program 12 discontinues authenticating the storage device 14 (operation 43), and completes the authentication process (operation 44).

While the inventive concept has been shown and described with reference to exemplary embodiments, it will be apparent to those skilled in the art that various changes and modifications may be made without departing from the spirit and scope of the present teachings. Therefore, it should be understood that the above embodiments are not limiting, but illustrative.

What is claimed is:

1. A system comprising:
 a computer system storing an application program to execute functions of a storage device;
 an intermediate converter connecting the computer system and the storage device; and
 the storage device storing a plurality of predetermined sector addresses and an order of the predetermined sector addresses,
 wherein the computer system authenticates the storage device using the application program and sector data stored at the predetermined sector addresses.

2. The system of claim 1, wherein the predetermined sector addresses are predetermined by both the storage device and the application program.

3. The system of claim 1, wherein the storage device changes a predetermined part of return data changed to specific values as specific offsets of the sector data stored at the predetermined sector addresses.

4. The system of claim 3, wherein, when the predetermined part of the return data has a predetermined pattern, the application program authenticates the storage device.

5. The system of claim 3, wherein the storage device provides the predetermined part of return data to the intermediate converter.

6. The system of claim 3, wherein the storage device performs an authentication process until a current sector address at which one of a read operation and a write operation is to be performed becomes identical with a last sector address, starting from a first sector address.

7. The system of claim 6, wherein the first to last sector addresses are necessary for performing the authentication process.

8. The system of claim 1, wherein the storage device is a memory card.

9. The system of claim 8, wherein the memory card is one of a memory stick (MS), a multimedia card (MMC), an XD picture (XD) card, a secure digital (SD) card, compact flash (CF), a smart media card (SMC) and a micro drive (MD).

10. A method of authenticating a storage device, which is connected to a computer system via an intermediate converter, to perform functions of the storage device, the method comprising:
 storing sector addresses and an order of the sector addresses in the storage device;
 changing a predetermined part of return data changed to specific values as specific offsets of sector data stored at a predetermined sector address; and
 providing the return data to the intermediate converter when the predetermined sector address is determined to be the same as a last sector address.

11. The method of claim 10, wherein the predetermined sector address is predetermined by both the storage device and an application program of the computer system.

12. The method of claim 11, wherein the application program authenticates the storage device when the predetermined part of the return data has a predetermined pattern.

13. The method of claim 11, wherein the authenticating a storage device includes receiving a request initiated by the application program to perform a read operation at the predetermined sector address.

14. The method of claim 10, wherein the authenticating a storage device includes incrementally determining whether each predetermined sector address is a last sector address, starting from a first sector address.

15. The method of claim 14, wherein the first to last sector addresses are necessary to perform the authenticating process.

16. The method of claim 10, wherein the storage device is a memory card.

17. The method of claim 16, wherein the memory card is one of a memory stick (MS), a multimedia card (MMC), an XD picture (XD) card, a secure digital (SD) card, compact flash (CF), a smart media card (SMC) and a micro drive (MD).

* * * * *